US011562519B1

(12) United States Patent
Alpert et al.

(10) Patent No.: US 11,562,519 B1
(45) Date of Patent: Jan. 24, 2023

(54) SYSTEM AND METHOD FOR CREATING AND DELIVERING HANDWRITTEN GREETING CARDS

(71) Applicant: FELT, Inc., Telluride, CO (US)

(72) Inventors: Tomer Alpert, Telluride, CO (US); Gracie Everitt, Telluride, CO (US); Jeffrey C Schwab, Seattle, WA (US); Molly McIntyre, Eagleville, PA (US); Matthew D Moon, Haslet, TX (US)

(73) Assignee: FELT, Inc., Telluride, CO (US)

( * ) Notice: Subject to any disclaimer, the term of this patent is extended or adjusted under 35 U.S.C. 154(b) by 0 days.

(21) Appl. No.: 17/509,677

(22) Filed: Oct. 25, 2021

Related U.S. Application Data

(63) Continuation-in-part of application No. 15/357,862, filed on Nov. 21, 2016, now Pat. No. 11,157,166.

(51) Int. Cl.
| | | |
|---|---|---|
| *G06F 3/04883* | (2022.01) | |
| *G06F 40/171* | (2020.01) | |
| *G06F 3/12* | (2006.01) | |
| *G06T 11/60* | (2006.01) | |
| *G06F 3/0482* | (2013.01) | |
| *G06F 40/186* | (2020.01) | |

(52) U.S. Cl.
CPC ............ *G06T 11/60* (2013.01); *G06F 3/0482* (2013.01); *G06F 3/04883* (2013.01); *G06F 3/1293* (2013.01); *G06F 40/171* (2020.01); *G06F 40/186* (2020.01); *G06T 2200/24* (2013.01)

(58) Field of Classification Search
CPC ... G06T 11/60; G06T 2200/24; G06F 3/0482; G06F 3/04883; G06F 3/1293; G06F 40/171; G06F 40/186
See application file for complete search history.

(56) References Cited

U.S. PATENT DOCUMENTS

| | | | |
|---|---|---|---|
| 2004/0001219 A1 * | 1/2004 | Wen ....................... | G06Q 30/06 40/124.11 |
| 2005/0275870 A1 * | 12/2005 | Elarde ..................... | B42D 5/04 358/1.15 |
| 2012/0011214 A1 * | 1/2012 | Silverbrook .......... | G06F 3/1204 709/206 |

(Continued)

FOREIGN PATENT DOCUMENTS

| | | | | |
|---|---|---|---|---|
| CA | 2881442 C | * 11/2019 | ........... | G06F 17/248 |
| WO | WO2001082537 A9 | * 12/2002 | ............. | G06Q 10/00 |

*Primary Examiner* — Yongjia Pan
(74) *Attorney, Agent, or Firm* — Staniford Tomita LLP

(57) ABSTRACT

A card creation system uses software tools on computing devices for coordinating and creating cards that include handwritten text for a recipient. The software is used to an organizer to create invitations to participate in a coordinated group card delivery for a recipient on a designated date for a specified event. The card creation invitations are distributed to invitees who can either accept or decline the invitation. The software can be used to create custom card designs that include handwritten text. The custom card designs are transmitted from the participant computing devices to a server. The card designs are reviewed, printed, and placed in separate envelopes. The printed and enveloped cards are then packaged in a single container. The single container is then sent in the card recipient on a designated delivery date.

20 Claims, 14 Drawing Sheets

(56) References Cited

U.S. PATENT DOCUMENTS

| | | | |
|---|---|---|---|
| 2013/0042509 A1* | 2/2013 | Hawkins | G06Q 30/06 |
| | | | 705/26.5 |
| 2014/0201624 A1* | 7/2014 | Clark | G06F 40/186 |
| | | | 715/243 |
| 2016/0149843 A1* | 5/2016 | Spicer | G06Q 10/101 |
| | | | 709/206 |
| 2017/0032449 A1* | 2/2017 | Munden | G06Q 30/0635 |
| 2017/0253068 A1* | 9/2017 | Fuller | B42D 15/027 |

* cited by examiner

| Invitees | Accepted | Card Received | Approved/Printed |
|---|---|---|---|
| Ava A. | X | X | X |
| Brad B. | X | | |
| Carl C. | X | X | |
| Dean D. | No | | |
| Earl E. | X | | |
| Fran F. | No | | |

SYSTEM AND METHOD FOR CREATING AND DELIVERING HANDWRITTEN GREETING CARDS

CROSS-REFERENCE TO RELATED APPLICATIONS

This application is a continuation in part (CIP) of U.S. patent application Ser. No. 15/357,862, "Automove Smart Transcription" filed on Nov. 21, 2016, now U.S. Pat. No. 11,157,166, which claims priority to U.S. Provisional Patent Application Ser. No. 62/258,180, "Automove Smart Transcription" filed on Nov. 20, 2015. U.S. patent application Ser. Nos. 15/357,862 and 62/258,180 are hereby incorporated by reference in their entirety.

BACKGROUND

This disclosure relates to a system and method for coordinating the creation of multiple cards that are individually placed in envelopes and packaged in a single container. The single container is then sent in the card recipient. The cards are c field of transcription, and more specifically, to smart transcription which places parts of a message in its proper place. Currently, transcribing involves the manual placement of the various parts of a message, a means is sought to simplify this task by analyzing the word and placing the text for the user.

SUMMARY

In some embodiments, a computer app running on mobile computing devices can be used for creating customized cards and provide a method for providing group collaboration cards. For example, the mobile computing device can used to coordinate card creation by many participants create cards for a single recipient. The app can have different modes of operation and give users the option of being a card program organizer or a card program participant. In the organizer mode, the app can provide the user with tools for creating invitations for participants to create cards for a recipient. The invitation can provide the card recipient's name, the reason or theme for the cards, a card completion deadline, and a card mailing or delivery date. The organizer can also input contact information for the participants which can include email, text, and/or social media contact information so the invitation can be transmitted invitee participants. Once the organizer sets up the card invitations, the invitations can be transmitted to each of the invitees. In an embodiment, the invitation an include a code such as a Quick Response (QR) or bar code. The QR or bar code can be scanned with a camera device and the associated computing device can open a browser window with a Uniform Resource Locator (URL) associated with the organizer's card creation invitation.

When the invitee receives the invitation, the app can be used to communicate with the organizer and create the card with handwritten text. The invitee can use the participant features of the app to accept or decline the invitation. If the user elects to participate, the app can be used to create the card design and add handwritten text to the card. When the invitees complete their cards the created card information can be forwarded to the organizer for review and the app can inform the organizer of the card status. The app can also automatically provide reminders to the invitees to complete the card by a designated delivery date if the cards are not completed within a predetermined time after accepting the invitation and/or a predetermined number of days prior to the deadline for delivering the cards to the recipient. The organizer can review the card and in some embodiments, the organizer may be able to edit the card design or return the card design to the card creator to correct errors before approving the card for printing. After each of the cards is approved, it can be printed and placed in an individual envelope. The cards and envelopes can then be placed in a container such as a box or a large envelope and the container can be mailed to the single card recipient on the designated mailing date.

As discussed, a mobile computing device can run a mobile application program for creating hand written cards. The computing device can display various card design options that can allow a user to select a basic card design template and then customize the card. The card design options can include: a variety of graphical designs, paper sizes, paper textured appearances, and paper color. In some embodiments, each of the offered card designs can have predetermined graphical designs, paper textures, paper weight, card pages, card configuration, card size, and card page colors. The user can select each of the card design options: graphical design, paper texture, card size, and card color. The user can also add photographs and handwritten text to the card.

To add text to the card, the user can select the page of the card that the hand written text is to be added. The user can write text into the touch screen of the mobile computing device and the computing device can detect the finger movement on the touch screen and convert the touch movements into handwriting. The mobile device can analyze the movement of a finger and determine a word from the analyzed finger movement. The system can then determine a part of a message based on the determined word and place the input word into a sequence of words to the message on the virtual paper. Based on the word placement and paper space analysis, the system can determine a last touch point of the last word input into the message on the virtual paper. The system can then move the virtual paper on the touch screen display to provide more clear space to the right of the last touch point so the user can input the next word. If the system determines that the message extends to a last touch point close to the right edge of the virtual paper, the system move the virtual paper up and provide space on the left side of the virtual paper for a new word to be written by the finger. Thus, the paper can move to the left or down and to the right after each word is input into the system.

In some situations, the system may have sufficient room for a short word but not a long word. The system can initially move the virtual paper to the left to provide space for the next word and the user can begin to input text for the next word. As the user inputs the next handwritten word, the system can determine that the new word is longer than expected and there is insufficient room for the new longer word. The system can move the virtual paper down and to the right and place the new longer word on the left portion of the new line of the message.

In another embodiment, a system comprises a processor and memory, wherein the processor and memory are communicably coupled to one another, wherein the processor is configured to perform one or more of receive a mobile device's analysis of a movement of a finger, determine a word from the analyzed finger movement, determine a part of a message based on the determined word, place the word in the message and based on the analysis, provide space for a new word to be written by the finger. The paper can move to the left if there is sufficient room for another word to the right side of the last touch point on the current horizontal line of the virtual paper. Alternatively, the virtual paper can move down and to the right if there is no more room on the right side after the last touch point of the last work that was input into the system.

In a further embodiment, a non-transitory computer readable storage medium configured to store instructions that when executed causes a processor to perform one or more of receive a mobile device's analysis of a movement of a finger, determine a word from the analyzed finger movement, determine a part of a message based on the determined word, place the word in the message. Based on the analysis, the system can provide space for a new word to be written by the finger either by moving the virtual paper to the left to provide room to the right of the last touch point or move the paper down and to the right to provide room for the new word.

Once the customized card with handwritten text is finished on the mobile computing device, the card information can be transmitted to a server computer. The finished customized card with handwritten text can then be printed by a printer in communication with the server computer. The mailing address and return address can be printed in handwritten text font on an envelope. The customized card can be placed in the envelope and the envelope can be sealed. A postage stamp can be placed on the envelope and the card can be mailed to the recipient.

DETAILED DESCRIPTION

It will be readily understood that the components of the present disclosure, as generally described and illustrated in the figures herein, may be arranged and designed in a wide variety of different configurations. Thus, the following detailed description of the examples of a method, apparatus, and system, as represented in the attached figures, is not intended to limit the scope of the disclosure as claimed, but is merely representative of selected examples of the disclosure.

The features, structures, or characteristics of the disclosure described throughout this specification may be combined in any suitable manner in one or more examples. For example, the usage of the phrases "examples", "some examples", or other similar language, throughout this specification refers to the fact that a particular feature, structure, or characteristic described in connection with the example may be included in at least one example of the present disclosure. Thus, appearances of the phrases "examples", "in some examples", "in other examples", or other similar language, throughout this specification do not necessarily refer to the same group of examples, and the described features, structures, or characteristics may be combined in any suitable manner in one or more examples.

Figure 10:
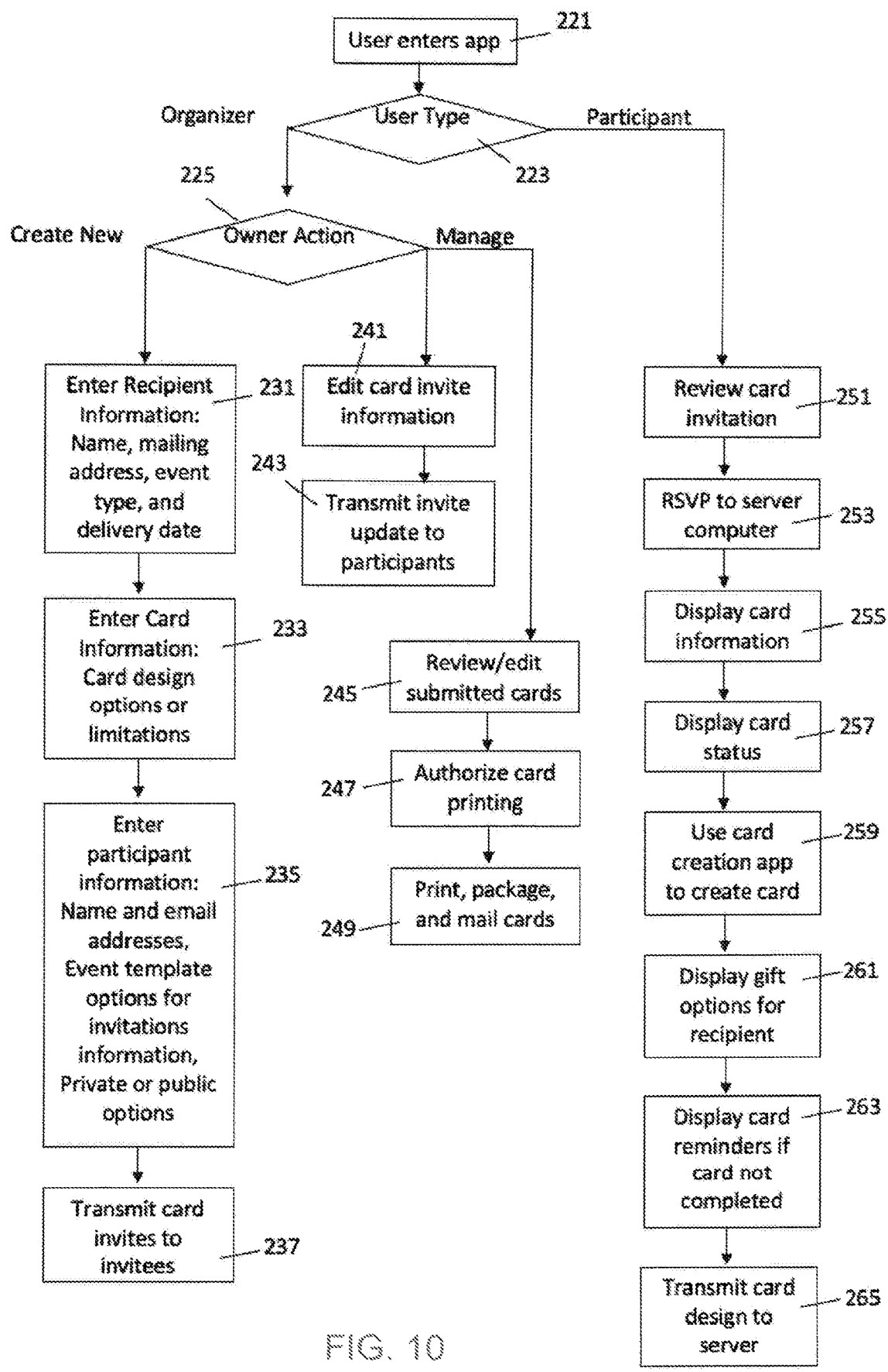
FIG. 10 illustrates a flow chart for inviting participants to create and manage the creation of cards to a recipient.

The present invention includes a system and method for creating and sending multiple custom greeting cards with handwritten text to a card recipient. In an embodiment, a mobile computing device can run a mobile application program for users to setup and organize a plurality of people creating cards for a recipient person or organization. With reference to FIG. 10, an embodiment of a flowchart is illustrated for organizing and participating in the creation and delivery of a plurality of handwritten cards to a recipient. When the user opens and enters the app 221, the system can display a user interface (UI) of the app asking the users if they are a card organizer or a card participant 223. The user can click on an organizer or a participant button on the UI. If the user clicks on the card organizer button, the UI can then the use can choose between creating a new card delivery or managing an existing card delivery 225.

Figure 11:
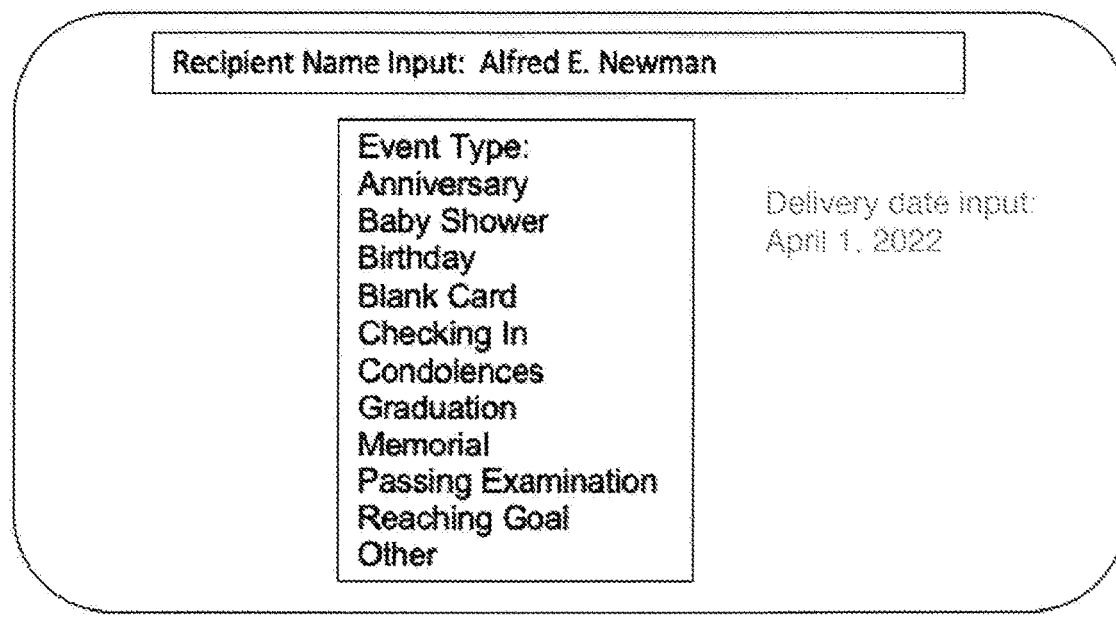
FIG. 11 illustrates an embodiment of a UI for organizing a card delivery to a recipient.

If the user selects to create a new card delivery, the user can input recipient information about the recipients of the cards 231. The recipient information can include: the name of the recipient, event, the mailing address, and the event date which can be the target delivery date for the cards. The UI may also ask the user to input the type of event for the cards. For example, the UI can display a pull down menu of possible events such as: birthday, anniversary, baby shower, education graduation, passing examination, sobriety anniversary, memorial, condolences, etc. The UI can also ask the user to input the date of the event which can be the day that the cards must be delivered to the recipient. An example of a UI for the recipient information input is illustrated in FIG. 11 which shows a recipient name input: Alfred E. Newman and a delivery date of Apr. 1, 2022. The event type has a drop down menu that includes a number of possible events. In this example, the event has not been selected yet.

The organizer can also input card information into the UI 233. The computing device can display various card design options and a user to select any of the desired card options. The card design options can include: a variety of graphical designs, paper sizes, paper textured appearances, and paper color. The user can select each of the card design options: graphical design, paper texture, card size, and card color. In some embodiments, the offered card designs can have predetermined graphical designs, paper textures, paper weight, card pages, card configuration, card size, and card page colors. The user can also add photographs and handwritten text to customize the card.

Based upon the event type, the UI can respond by offering the organizer different sets of card templates that are appropriate for the event. The card templates can offer the users a wide variety of card options that can allow the user to customize the cards based upon color, graphic designs, text messages, photographs, etc. Happy events such as birthday, anniversary, baby shower, education graduation, passing examination, etc., can have sets of card templates that have festive colors and happy and/or funny card template messages. In contrast, other events such as memorials and condolences can have more somber colors and messages for these event card templates. It could be inappropriate to offer festive card options for a somber event such as a memorial. The organizer can either select an event template which can limit the template options offered to the participants through a button displayed on the UI. Alternatively, the organizer may choose to not limit the card templates that are available to the participants. In an embodiment the UI can also have a card design review system where the card options are illustrated on the UI so that the organizer can see what the options will look like before finalizing the card information.

Based upon the event type, the app can provide the organizer with templates for the email invitations to the participants. Again, happy events can have festive invitation templates while somber events can have less festive invitation templates. The organizer can select an invitation template and create a card participation email invitation. The organizer can also select public or private options. The public option can allow the card invitation to be shared with others outside the participants list and may also allow the status of each participant's name and card status to be seen by others. In contrast, if the organizer selects the private option, the card invitation may not be shared with others outside the participants list, the names of each participant is not published and/or the card status cannot be seen by others. The app can allow the organizer to review the settings and information for the card event and allow the organizer to edit the card event information. Once the organizer approves the card invitation information, the UI can display a transmit invitations button and when the button on the UI is actuated, the server can transmit invites to invitee participants 237. The invitations can be email letters and/or text messages that can be sent to each of the invitees that can include a QR or bar code. When a user scans or detects the QR or bar code, the UI can be directed to a URL that can include the card participation invitation.

Figure 12:
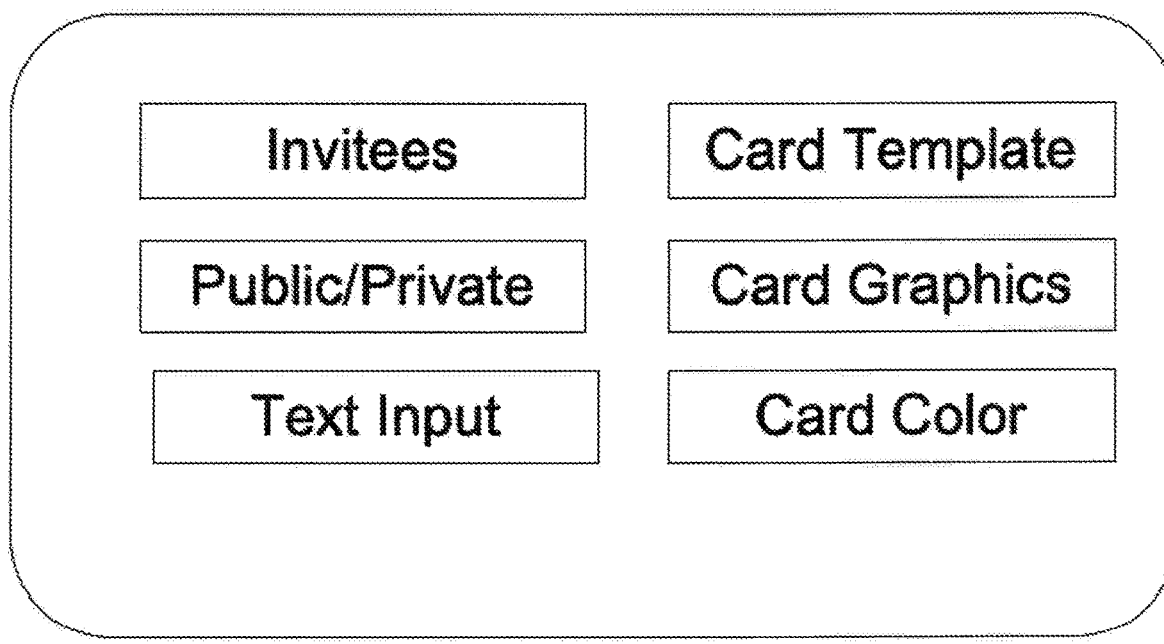
FIG. 12 illustrates an embodiment of a UI for creating an invitation for participation in a card delivery to a recipient.

An example of a UI for input card information is illustrated in FIG. 12. The organizer can click on a button and input the card information. The organizer can click on the invitee button to input the invitees for the card creations for the recipient. The organizer can click on the public/private button to control the publication or concealment of recipient and invitee information. The organizer can click on the text input button to enter text for the card invitation which can be used to explain the details of the card creation and delivery to the recipient. The organizer can click on the card templates to control and set the card templates that can be offered to the card creation invitees. The organizer can click on the card templates to control and set the card graphics that can be offered to the card creation invitees. The organizer can click on the card templates to control and set the card and envelope colors that can be offered to the card creation invitees.

The organizer can then input information about the participants through the UI 235. The participant email and/or text message information can be used to invite and remind the participants to create and send customized cards with handwritten text to the recipient. The participant information can include: participant names and email addresses for the participants.

The management of the card creation can include two options which can include editing the card participation invitation and processing the cards completed by the participants. If the organizer needs to revise any of the card invitation information, the user can enter the app 221 and the select the organizer 223 and the owner action manage 225 options through the UI. The UI can display all of the active card invitations that are associated with or managed by the organizer. The organizer can select the desired active card invitation that needs to be revised and the UI can allow the organizer to review and edit the card invitation information 241. The UI can allow the user to confirm the card invitation edits and after the organizer confirms approval of the revisions, the organizer can press an accept changes button on the UI which can cause the server to transmit an email or text message to the participant invitees informing them of the changes to the card invitation 243. The invitation revisions can be emailed or texted to each of the invitees and the invitation revision can include a QR or bar code. In an embodiment, the revised invitations may only be sent to the participants who have elected to participate and may not send the revised invitation to participants who have elected not to participate. When a user scans or detects the QR or bar code, the UI can be directed to a URL that can include the revised card participation invitation.

Figures 15, 16:
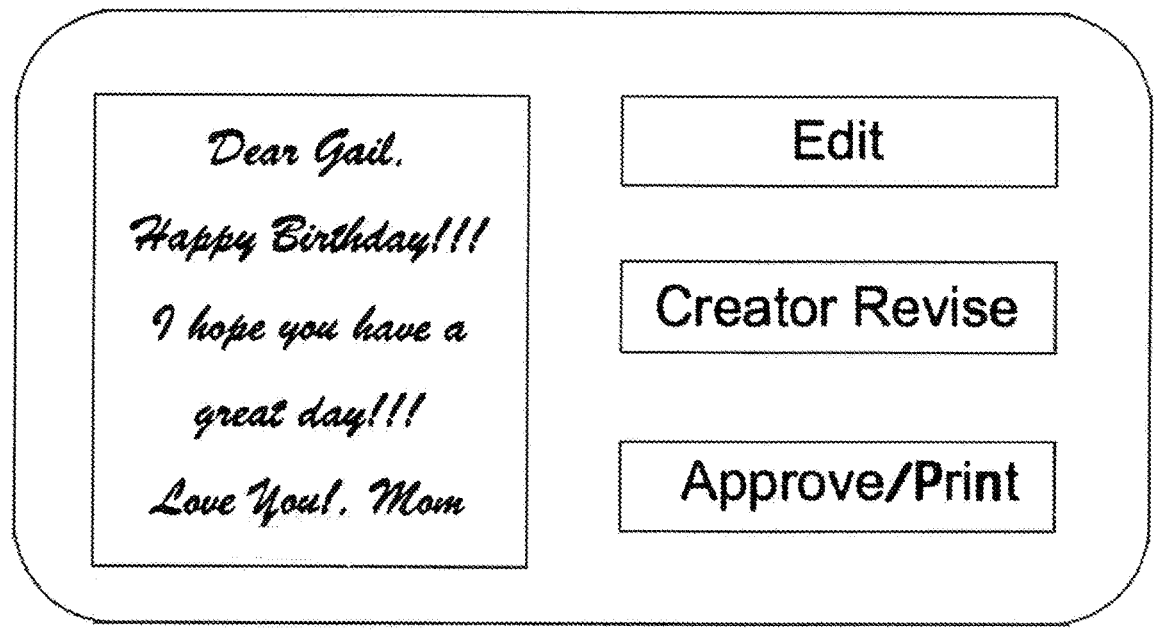
FIG. 15 illustrates an embodiment of a UI having tools for creating a card.
FIG. 16 illustrates an embodiment of a UI showing the status of invitee cards.

When the participants receive the card invitation, the user can download the card app onto their mobile computing device and user can enter the app 221. The user can then input the user type as participant 223. The user can review his or her card invitations 251. If the card invitation is rejected, there can be no further interaction with the card invitation. However, if the user elects to participate, the user can join the card group and an acceptance RSVP message can be transmitted to the server computer 253. The UI of the user's computing device can display the card information which as discussed above can include the name of the recipient, the event, and the event date which can be the target delivery date for the cards to the recipient 255. The UI can display the card status of the invited participants 257. FIG. 16 illustrates an example of an embodiment of a card status UI. By displaying the card statuses, the invitees can be encouraged to complete their cards. The invitee can use the app running on the computing device to create the card 259. The app can provide various options for creating the cards including numerous templates which can include card graphic designs, messages, colors, fold layouts, font options, etc. The user can select the desired template and design options. The app can also allow the user to add photographs and handwritten text. The app can allow the user to save the card design work so that the card can be completed at a later time.

Figure 13:
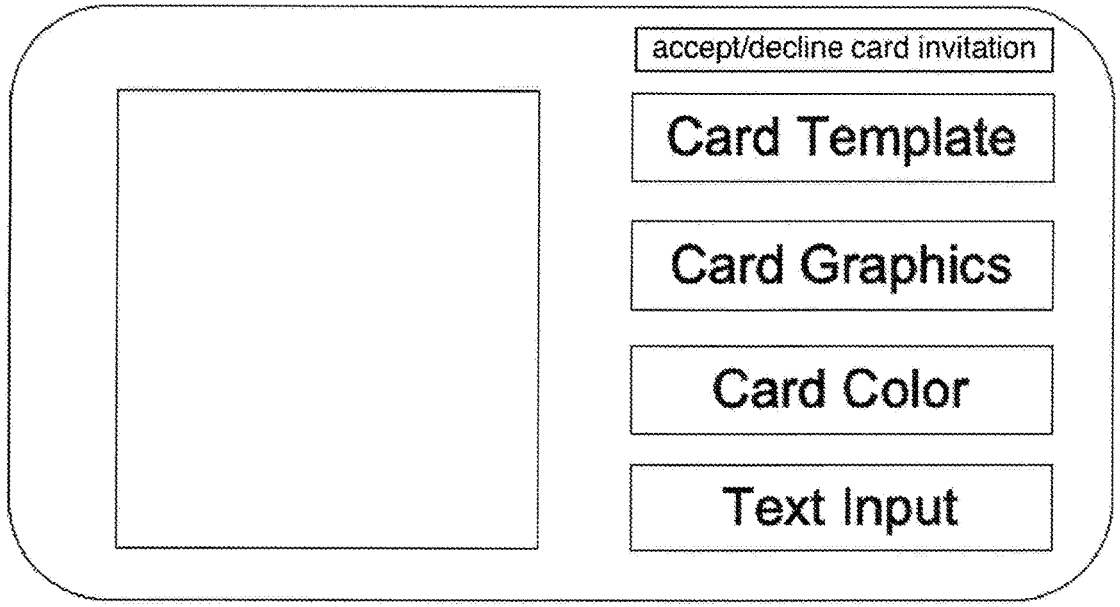
FIG. 13 illustrates an embodiment of a UI for designing a card.

FIG. 13 illustrates an embodiment of a UI that includes tools for creating a card design. The user can click the card template button to select a card template from a plurality of appropriate designs. The user can click on the card graphics button to access a plurality of graphical designs and select one or more graphic designs for the card. The user can click on the card color button to select a desired card color. The user can click on the text input button to input handwritten text on the card. The UI can display at least a portion of the card created by the user.

In addition to card design tools, the app can also allow the participant to add gift options to the card recipient 261. The gifts can include small items that can be added to the card or placed in the package containing the cards such as gift cards, money, jewelry, and other small gift items. Alternatively, if the participant selects a larger gift, these larger gifts can be mailed separately from the gift source to the recipient. The app can include a payment input to pay for any selected gift, tax, and shipping of the gift is shipped separately from the handwritten cards.

Figure 14:
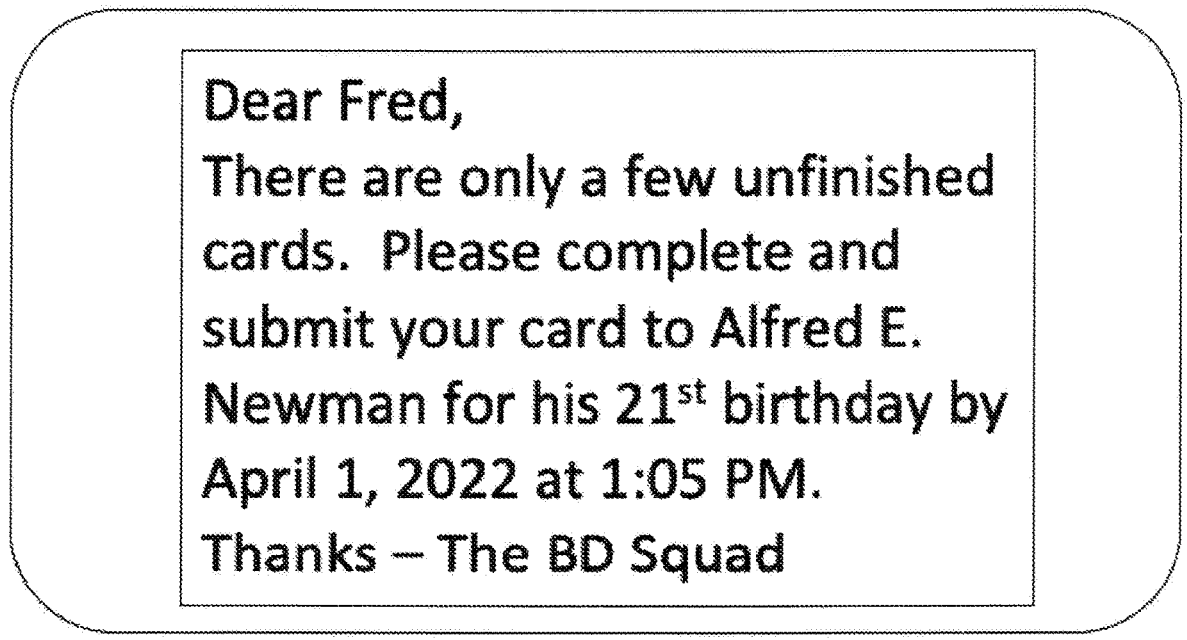
FIG. 14 illustrates an embodiment of a UI reminder to create a card.

The app can output visual display and or audio reminders to participants if the participant has not completed the card. The server can also transmit email and text reminders to participants who have elected to participate in the card. The server cannot send reminders to invitees who have elected to not participate in the card delivery to the recipient. The reminder can include the recipient name, event, and card deadline. The reminder can also include the status of the other invitees indicating how close the invitees are to completing the cards by the deadline. When the card is completed, the UI of the app can display a complete and transmit button. When the complete and transmit button is pressed by the user, the computing device can transmit the card design to the server computer 265. An example of a reminder is illustrated in FIG. 14. In this example, a message to the invitee reminds the invitee of the recipient, the event, and the card deadline.

When the completed card is transmitted to the server, the server can transmit a notification email or text message to the organizer. The organizer can then access the card by entering the app 221, inputting the user type as organizer 233 and then selecting the owner action of managing 225 and selecting the card review option. The UI of the app can display a listing of the completed cards and the review/print status for each of the cards. The organizer can select a card to review. The app can allow the organizer to make minor edits to the cards in order to correct typographical errors and/or remove potentially problematic text. In some situations, a trolling individual may infiltrate the invitee list and submit an inappropriate card. The app can give the organizer to option of deleting cards at the organizer's discretion. In other embodiments, the organizer can send a message and give the card creator the option of revising the card if the message has errors. The card creator can respond by editing the card as described at step 259 and then transmit the revised card back to the server as described at step 265. The revised card can then be reviewed again by the organizer. The UI can provide a print authorization button. Once the organizer has approved the card, the organizer can press the print authorization button to cause the server to print the approved card 247.

An example of the card review UI is illustrated in FIG. 15. In this example, the UI illustrates the handwritten text created by an invitee. The UI can have an edit button to allow the organizer to make minor edits. Alternatively, the UI can have a creator revise button which can notify the card creator that some edits may be necessary. For example, the creator may have misspelled the recipient's name or gotten the event incorrect in the handwritten message. Finally, if the organizer approves the card for printing, the organizer can press the approve/print button which causes the server to print the card.

The card can be printed by the server and the status indicator for the card can indicate that the card was received, approved, and printed. At or before the designated delivery date, the received cards can be printed, placed in a love bomb package and mailed to the recipient 249. In other embodiments, the service provider can have its own delivery service which can deliver the cards can be printed, placed in a love bomb package, and delivered to the recipient on the designated day.

In an embodiment, the organizer can monitor the progress of the card invitations, card creations and card printings. An example of a card status UI is illustrated in FIG. 16. The published invitees' names are listed on a left column and the UI displays the acceptance status, completed card received status, and the approved/printed status of cards. In this example, Ava A. has accepted the invitation to create a card, the card created by Ava A. has been received, and the card has been reviewed, approved and printed. Brad B. and Earl E. have accepted the invitation but their completed cards have not been received or approved/printed. Carl C. has accepted the invitation and the completed card has been received by the server but the card has not been reviewed, approved, or printed. Dean D. and Fran F. have rejected the invitation.

In addition to inputting the card chosen design options, the user can then customize the card by adding handwritten text. The card can be displayed on the mobile computing device and the user can select the area of the card to add the handwritten text. The system can display an enlarged view of the blank portion of the card for the handwritten text and the user can move a finger on the touch screen to create the lines for the handwritten text. The system can analyze the line inputs from the user and determine each word that is input. The system can identify the last touch point of each word and from the last touch point, the system can move the display to create a new space for the next word. In an embodiment, the system may automatically detect the last touch point of the input handwritten word. In other embodiments, the touch screen can have a button and when the full hand written word is input, the user can press the word input button and the screen can move to the left or up and to the right to create additional space for the next sequential word in the message to be input through the UI.

Automove automatically moves virtual card to where an empty space where the user can add additional handwritten. Users want their handwriting to look very nice. When writing with your finger or a stylus a user might need the total writing surface to extend beyond the physical bounds of the user's computing device. In these instances, the user would greatly benefit from a feature that would automatically move virtual paper to an empty location after the end of the last word or drawing they made. Automove may be used on any surface that may be written upon such as an envelope, a card, a photo, a coloring book, and the like. Automove does not rely on any specific surface condition or material to be functional.

The Automove could jump to the end of a word or any other place on the paper the user would want. The Automove could also predict where the user wants it to be placed. Automove could show movement or could just make the writing area appear in the new position. Automove could be used with handwriting, typing, data selection, data input or other user inputs.

In order to send a card by mail carrier service, a user may need to input name and address information for the recipient. This information is needed for the recipient receiving the card. The recipient doesn't want this information being available though. However, it's information that our system needs to know. In some embodiments, the system can look up the recipient's mailing address using public info like name, email, etc. For subsequent orders for cards being sent to the same recipient, the recipient name and address can already be stored on a recipient database. The user can submit the card information and the system can print the card and the address on the envelope.

The address book could be used to send cards via mail, email, text message, posting online on websites or other physical or electronic delivery including courier. The address book could be used to track and display the number of cards a user has received, is going to receive, wants to receive, etc. The address book could be used to display dates like birthdays, anniversaries or other dates. It could display the user's information and information for other people associated with the user like their children. Matching local artists with local fans is currently difficult to achieve due to the lack of technology to properly classify local artists and search nearby events within a prescribed location. The address book could allow for connections between users which users would need to request, approve or deny. The address book could allow a user to create profiles for anyone they wish, not just themselves. It could then send these users some form of communication for them approve or it could automatically create their profiles.

Some users enter their information in to the database. Public info and private info. Public info like name, email, phone, public social handles and private info like their mailing address and their birthday. Some other users look people up by their public or private info. Based on the user's setting they will see certain user info data. The user has the ability to keep data like an address private so that those looking them up may get their name or other public information, but not their mailing address. The system has access to the user's inputted data. This allows the user to designate what information is public and what information is private. For example, you may make your name, employer and city public and keep your mailing address private. The system would print the mailing address on the envelope after an order is placed to that the sender of the card may not see your address, but it is printed on the envelope by the system.

Figure 1:
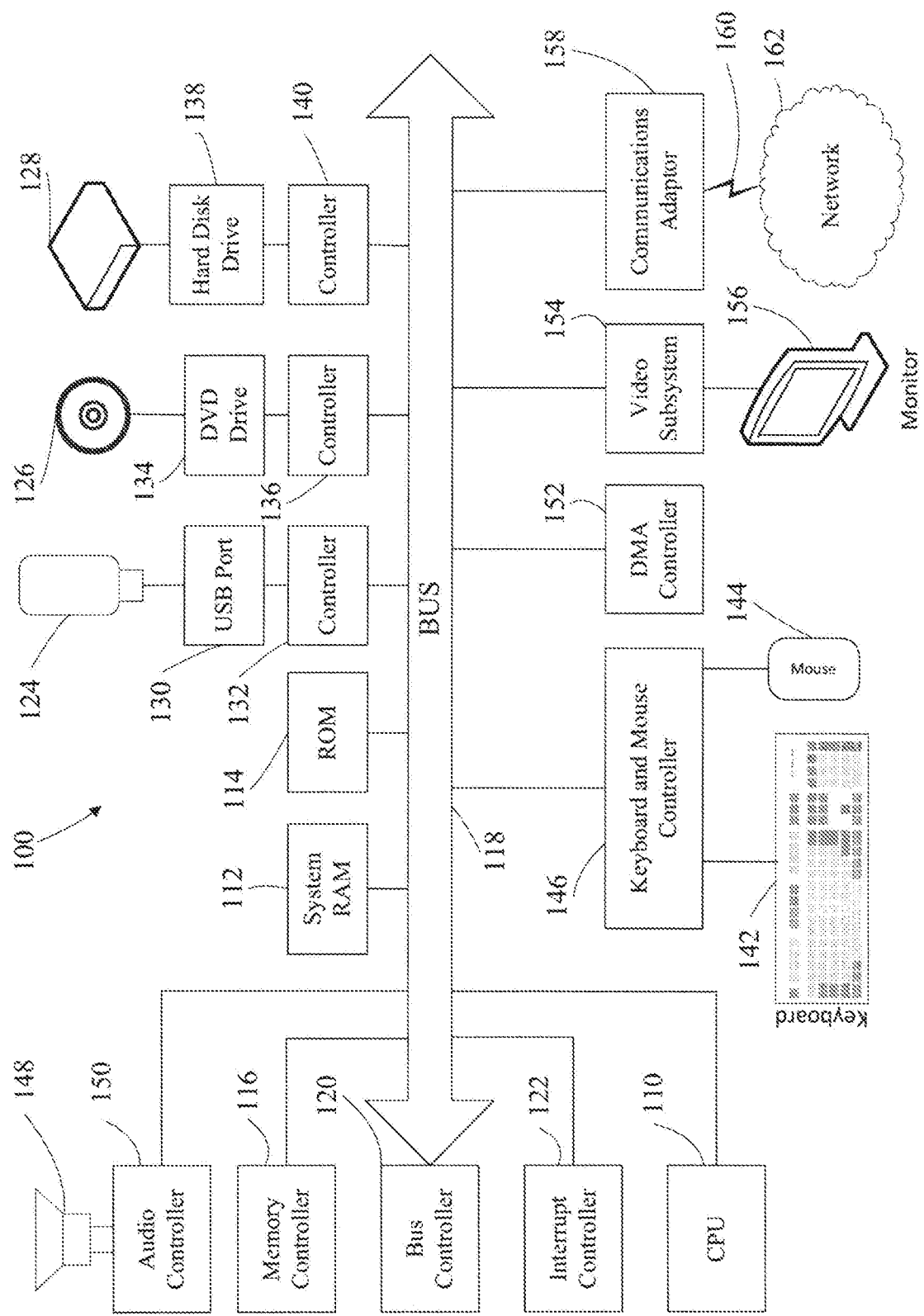
FIG. 1 illustrates a block diagram showing a computer system suitable for practicing an embodiment of the disclosure.

Computer System FIG. 1 illustrates the system architecture for an exemplary computer system 100 with which the current disclosure may be implemented. The exemplary computer system of FIG. 1 is for descriptive purposes only. Although the description may refer to terms commonly used in describing particular computer systems, such as a personal computer, the description and concepts equally apply to other systems, including systems having architectures dissimilar to FIG. 1.

Computer system 100 typically includes a central processing unit (CPU) 110, which may be implemented with one or more microprocessors, a random access memory (RAM) 112 for temporary storage of information, and a read only memory (ROM) 114 for permanent storage of information. A memory controller 116 is provided for controlling RAM. A bus 118 interconnects the components of the computer system. A bus controller 120 is provided for controlling the bus. An interrupt controller 122 is used for receiving and processing various interrupt signals from the system components. Mass storage may be provided by flash 124, DVD 126, or hard disk 128, for example a solid-state drive. Data and software may be exchanged with the computer system via removable media such as the flash drive and DVD. The flash drive is insertable into a Universal Serial Bus, USB, drive 130, which is, in turn, connected to the bus by a controller 132. Similarly, the DVD is insertable into DVD drive 134, which is, in turn, connected to bus by controller 136. Hard disk is part of a fixed disk drive 138, which is connected to the bus by controller 140.

User input to the computer system may be provided by a number of devices. For example, a keyboard 142 and a mouse 144 are connected to the bus by a controller 146. An audio transducer 148, which may act as a microphone and a speaker, is connected to bus by audio controller 150, as illustrated. Other input devices, such as a pen and/or tabloid, may be connected to the bus and an appropriate controller and software. DMA controller 152 is provided for performing direct memory access to the system RAM.

A visual display is generated by video subsystem 154, which controls video display 156. The computer system also includes a communications adaptor 158, which allows the system to be interconnected to a local area network (LAN) or a wide area network (WAN) or other suitable network, schematically illustrated by a bus 160 and a network 162. Operation of the computer system is generally controlled and coordinated by an operating system, such as the Linux. The operating system controls allocation of system resources and performs tasks such as processing scheduling, memory management, networking, and I/O services, among other things.

Figure 2:
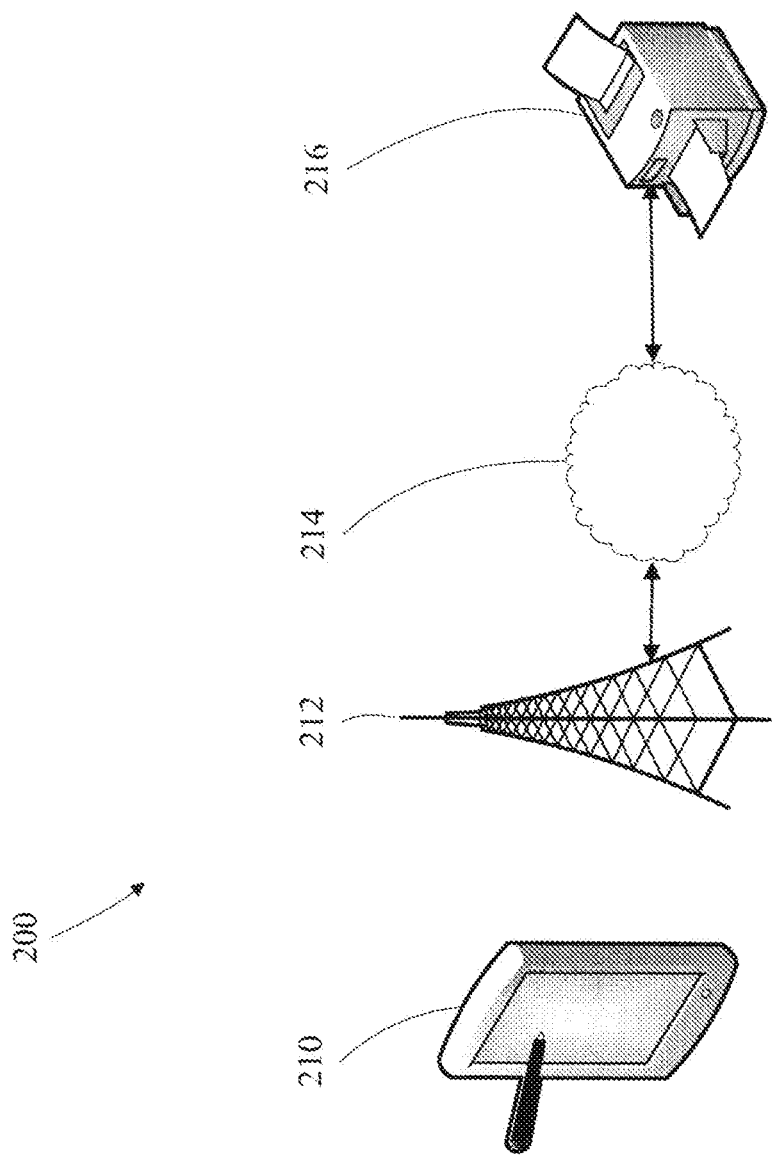
FIG. 2 illustrates a block diagram showing a tablet based system suitable for practicing an embodiment of the disclosure.

Computer System FIG. 2 illustrates the system 200 in which the user device 210 is connected to a network 212 which in turn is connected to the cloud 214 and at least one printer for printing out a message. The computer may request data from the cloud or server via the network. The data may be present in local memory, the cloud or the server. Results provided to the user through the mobile device may be provided via the network from the cloud or the server. The processor in the local user's computer, the cloud or the server may use the logic and algorithm to provide the results.

Figure 3:
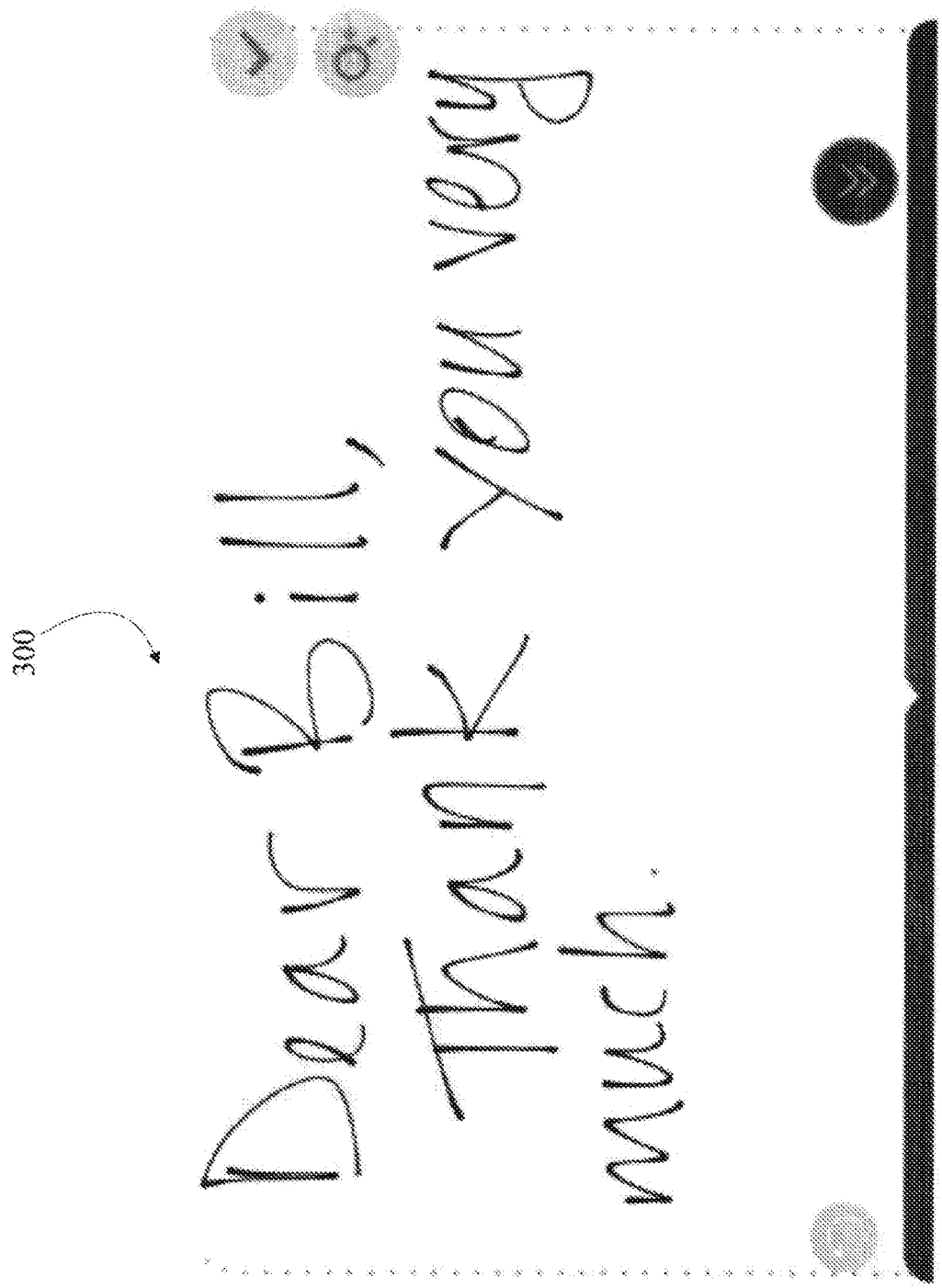
FIG. 3 illustrates an example transcribed message.

FIG. 3 illustrates an example message 300 viewable on a mobile device display screen. The various parts of the message such as the salutation are automatically placed on virtual paper by the system as the user moves his or her finger on the touch sensor of the mobile computing device. In the illustrated examples which follow, the mobile computing device's operating system detects and analyzes the movement of the finger on the touch screen UI. The input is analysized and read by the system and then the users' finger movements, i.e. handwriting, is drawn on the touch screen display. The system identifies the last spot the user wrote on the touch screen. The system can then either automove or respond to a button press which causes the text and virtual paper to create a free blank space on the screen of the computing device. More specifically, the screen can move the text and paper to move to the left so that new text can be placed to the right of the prior text. Alternatively, if there is no more space to the right of the last word input, the paper and text can be moved up and right so that free space is displayed on the next lower subsequent line so that more text can be added to the card.

Figure 4:
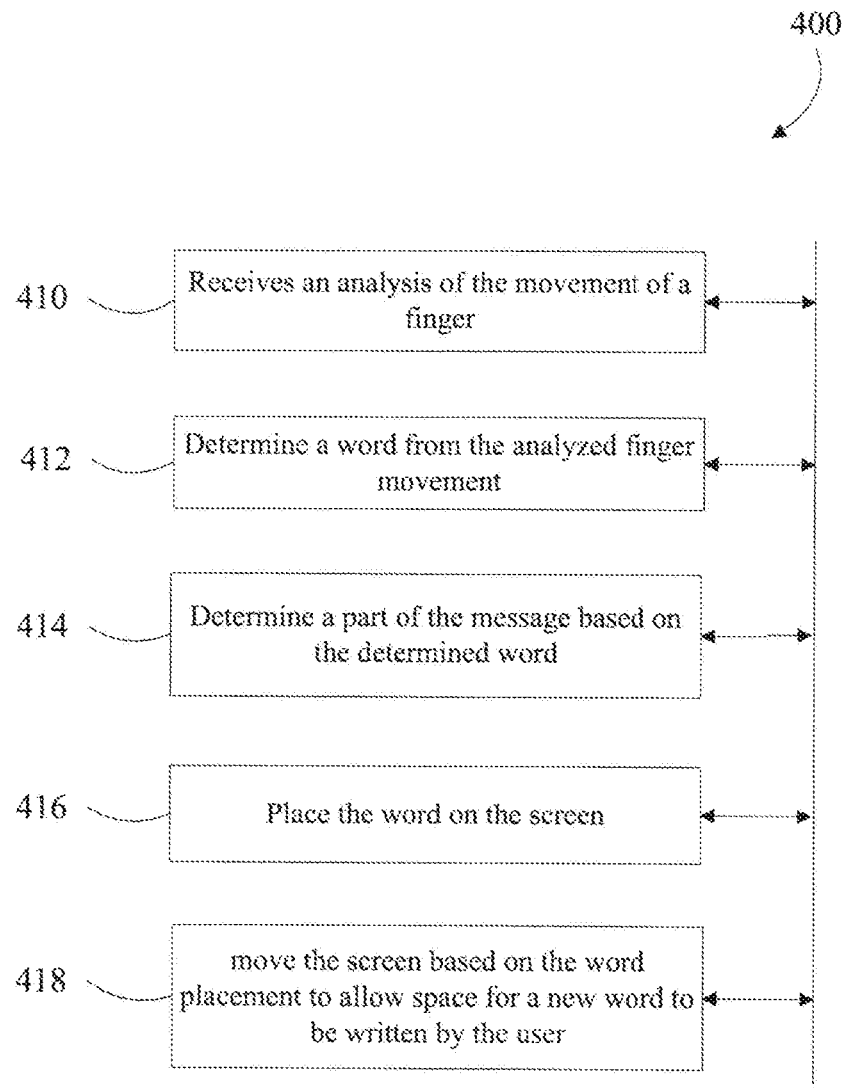
FIG. 4 illustrates a first example method for practicing an embodiment of the disclosure.

FIG. 4 depicts a first example 400 method comprises the following actions receive 410 a mobile device's analysis of finger movement, determine 412 a word from the analyzed finger movement, determine 414 a part of the message based on the determined word, place 416 the word in the message and move 418 the screen based on the analysis to allow space for a new word to be written by the user.

Figure 5:
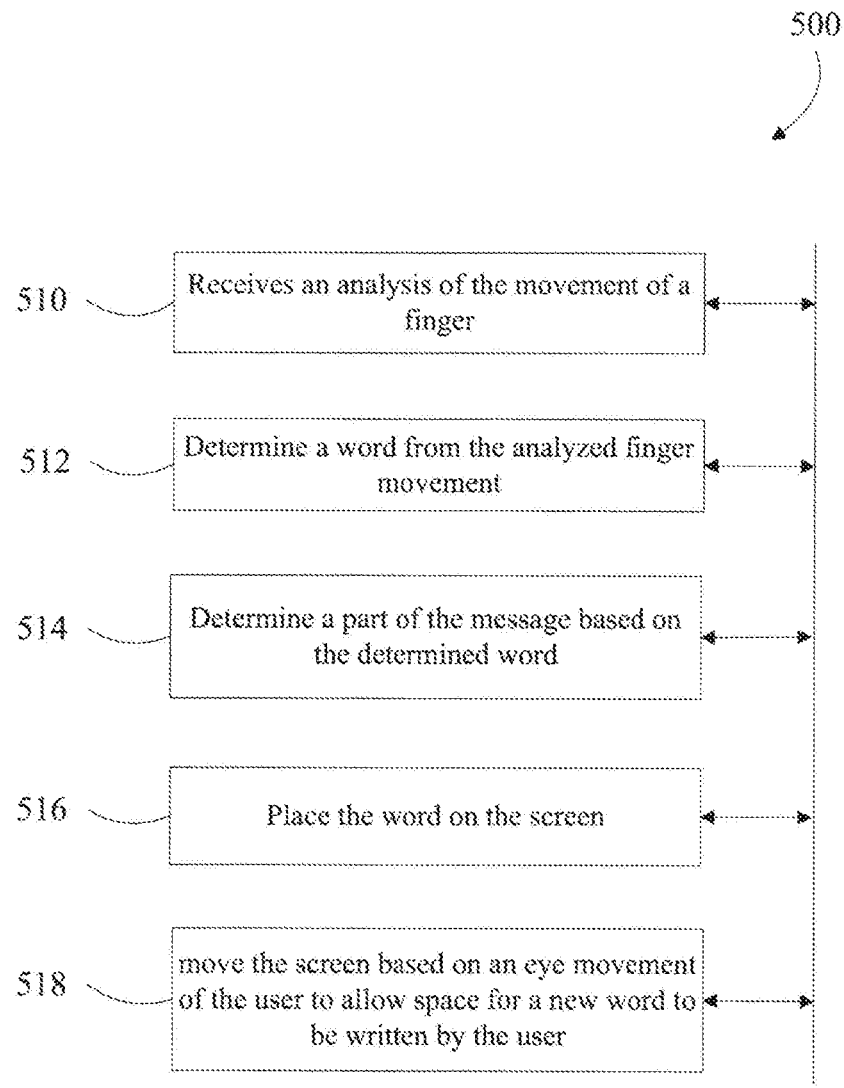
FIG. 5 illustrates a second example method for practicing an embodiment of the disclosure.

FIG. 5 depicts a second example method 500 comprises the following actions receive 510 a mobile device's analysis of finger movement, determine 512 a word from the analyzed finger movement, determine 514 a part of the message based on the determined word, place 516 the word in the message and move 518 the screen based on an eye movement of the user to allow space for a new word to be written by the user.

Figure 6:
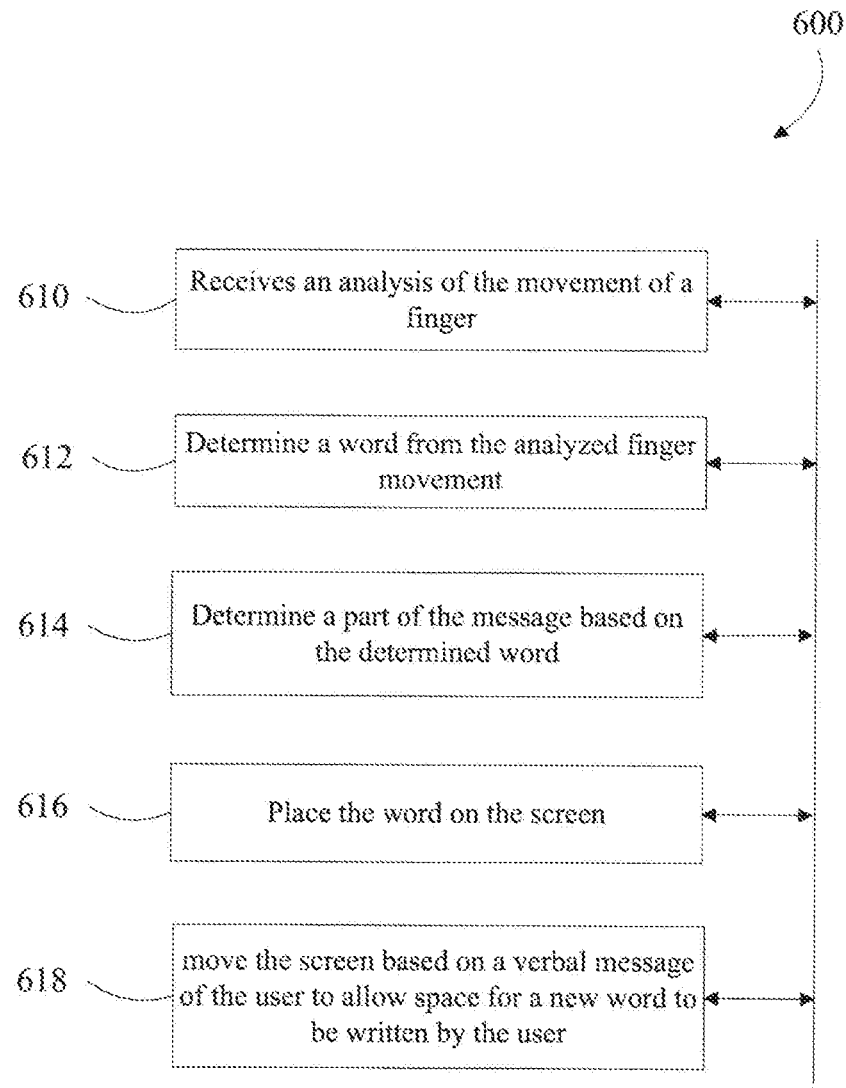
FIG. 6 illustrates a third example method for practicing an embodiment of the disclosure.

FIG. 6 depicts a third example method 600 comprises the following actions receive 610 a mobile device's analysis of finger movement, determine 612 a word from the analyzed finger movement, determine 614 a part of the message based on the determined word, place 616 the word in the message and move 618 the screen based on a verbal message of the user to allow space for a new word to be written by the user.

Figure 7:
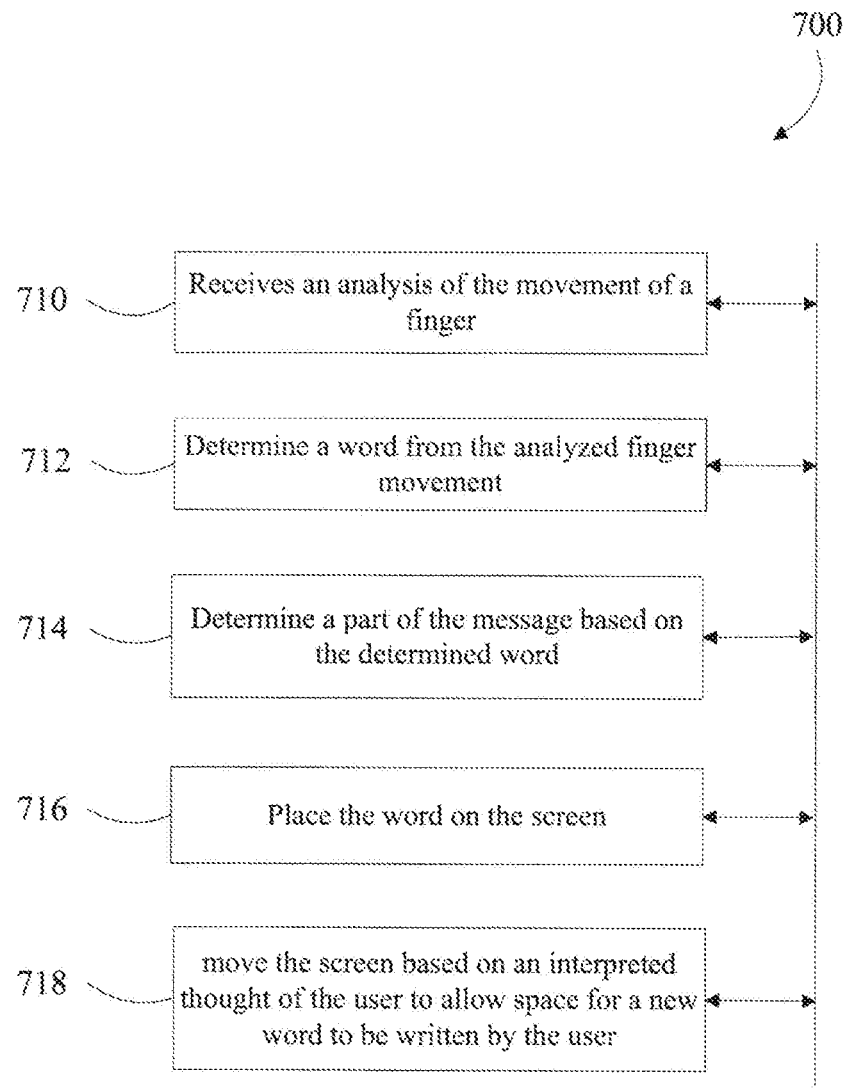
FIG. 7 illustrates a fourth example method for practicing an embodiment of the disclosure.

FIG. 7 depicts a fourth example method 700 comprises the following actions receive 710 a mobile device's analysis of finger movement, determine 712 a word from the analyzed finger movement, determine 714 a part of the message based on the determined word, place 716 the word in the message and move 718 the screen based on an interpreted thought of the user to allow space for a new word to be written by the user.

Figure 8:
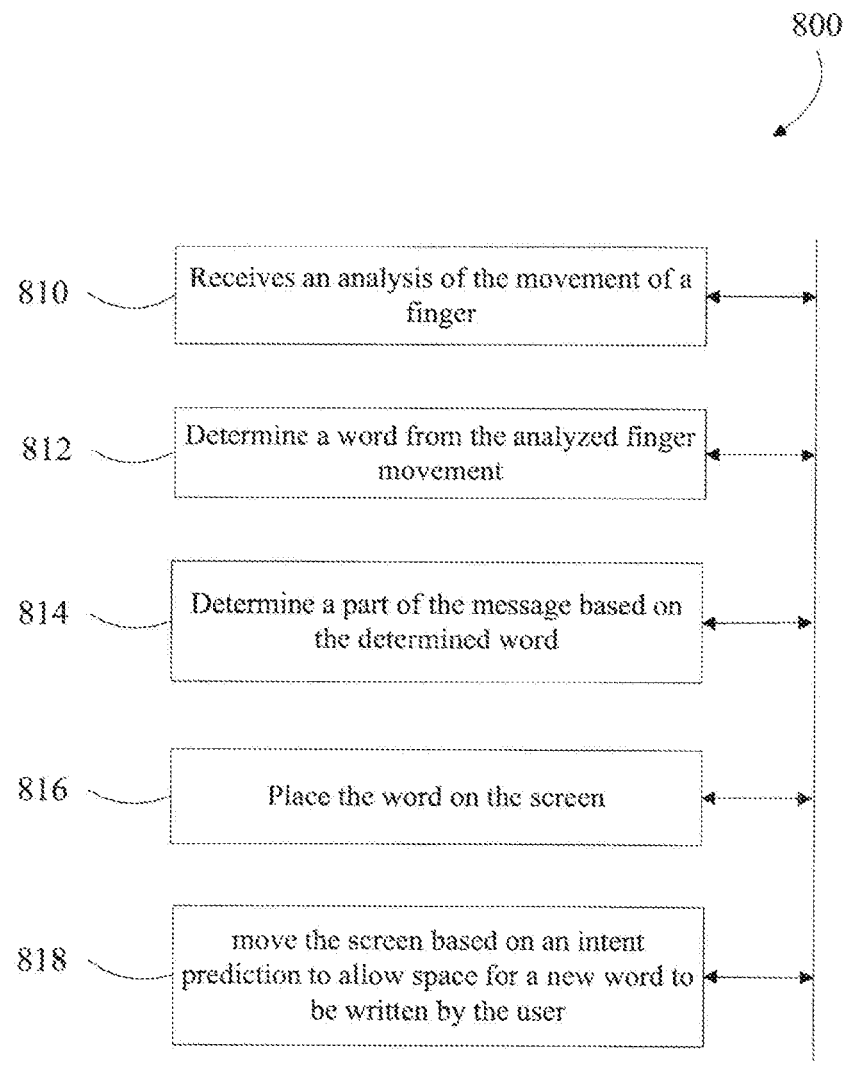
FIG. 8 illustrates a fifth example method for practicing an embodiment of the disclosure.

FIG. 8 depicts a fifth example method 800 comprises the following actions receive 810 a mobile device's analysis of finger movement, determine 812 a word from the analyzed finger movement, determine 814 a part of the message based on the determined word, place 816 the word in the message and move 818 the screen based on an intent prediction to allow space for a new word to be written by the user.

Figure 9:
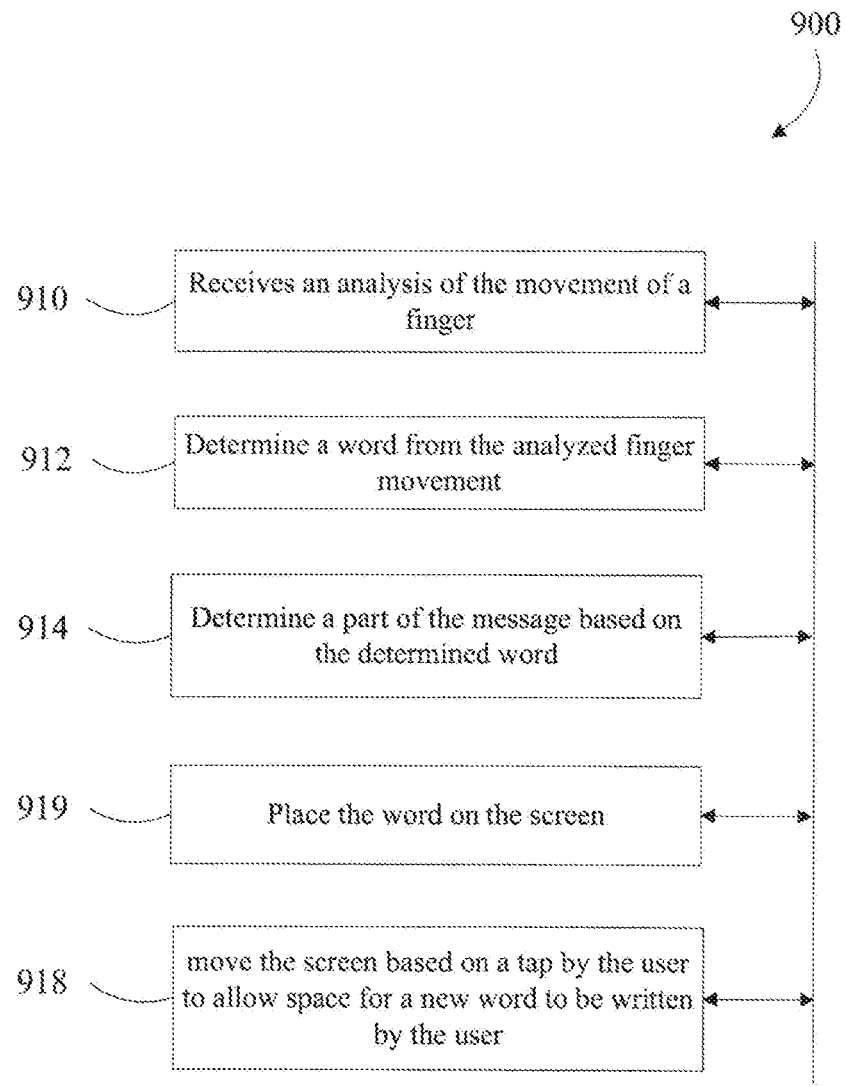
FIG. 9 illustrates a sixth example method for practicing an embodiment of the disclosure.

FIG. 9 depicts a sixth example method 900 comprises the following actions receive 910 a mobile device's analysis of finger movement, determine 912 a word from the analyzed finger movement, determine 914 a part of the message based on the determined word, place 916 the word in the message and move 918 the screen based on the word placement to allow space for a new word to be written by the user. As the written line is created, the system keeps track of the x and y coordinates of the last drawn point. When the Automove button is touched, a check is performed to determine whether the writing area is zoomed in. If the writing area is not zoomed in, the Automove button moves the writing area down the y axis by the height of the writing screen by a predetermined amount, in this example the writing area divided by fifteen. If this amount would move the user beyond the maximum y location of the work area, the system simply sets the y coordinate to the external edge of the screen, while the x coordinate is not unaffected.

If the writing area is zoomed in, the Automove tool calculates the distance to move in the x and y axes. The system determines whether a last drawn point exists. The y distance is calculated based on a number of guidelines the user currently has activated. In order to determine the amount of height to shift the paper by the y distance is calculated by taking the current y coordinate of the writing area, and adding to it the height of the writing area divided by a predetermined amount, in one example eleven times the zoom scale of the writing area. In another example we divide by twenty-one times: the y distance is calculated by taking the current y coordinate of the writing area, and adding to it the height of the writing area divided by a predetermined amount, in this example twenty-one times the zoom scale of the writing area. The writing area is then set to this new y coordinate and the x coordinate is unaffected.

If a last drawn point exists, and the writing area is not at the maximum x or y coordinate based on the size of the screen. The x distance is calculated by multiplying the x location of the last written point by the zoom scale of the writing area, then subtracting a predetermine amount, in this case fifty times the zoom scale of the writing area minus ten i.e. (lastX*zoomScale)−((50*zoomScale)−10). The x coordinate of the writing area is then set to the x location indicated by this calculation and the y location is unaffected.

If the writing area is currently at the maximum x coordinate and not the maximum y coordinate. The x coordinate is set back to the origin of the writing area. The y distance is calculated based on a predetermined line height set by the user. The user determines their line height by a number of ways. For example, they may select a desired line height for preset options or they may manually set any number of lines they wish to have. If the user does not set a line height then one is automatically set for them and calculated movement as follows: the y distance is calculated by taking the current y coordinate of the writing area, and adding to it the height of the writing area divided by eleven times the zoom scale of the writing area. If the user has specified a line height then, the y distance is calculated by taking the current y coordinate of the writing area, and adding to it the height of the writing area divided a set number, in this case by twenty-one times the zoom scale of the writing area. The writing area is then set to this new x and y coordinate.

If the writing area is at the maximum y coordinate and not the maximum x coordinate the x distance is calculated by multiplying the x location of the last written point by the zoom scale of the writing area, then subtracting a predetermined amount, in this example fifty times the writing area zoom scale minus ten ie. (lastX*zoomScale)−((50*zoomScale)−10). The Automove tool then moves the writing area to the x location indicated by this calculation and the y location is unaffected. If the writing area is at the maximum y coordinate and the maximum x coordinate and the x and y coordinates are unaffected. Auto move may be used on any surface such as cards, envelopes, photos, letter paper, notebook paper, other writing surfaces and the like.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, which may represent any of the above-described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

Figure 17:
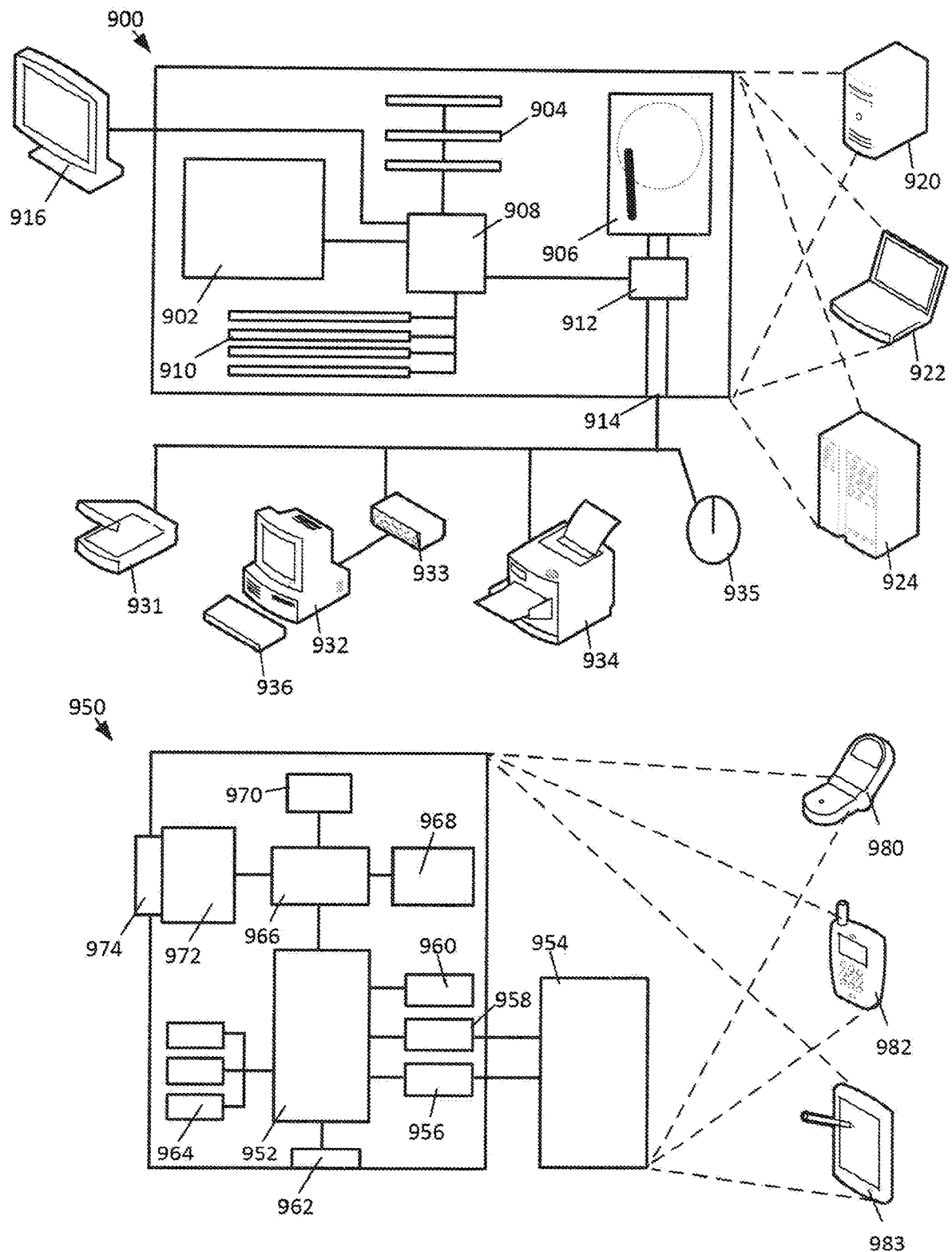
FIG. 17 illustrates a computer system that can be used with the present invention.

FIG. 17 shows an example of a generic computer device 900 and a generic mobile computer device 950, which may be used to implement the processes described herein, including the mobile-side and server-side processes for installing a computer program from a mobile device to a computer.

Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The present disclosure, in various embodiments, includes components, methods, processes, systems, and/or apparatus substantially as depicted and described herein, including various embodiments, subcombinations, and subsets thereof. Those of skill in the art will understand how to make and use the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease, and/or reducing cost of implementation. Rather, as the following claims reflect, inventive aspects lie in less than all features of any single foregoing disclosed embodiment.

What is claimed is:

1. A method, comprising:
   providing a server computer and a card app running on an organizer computing device and participant mobile computing devices;
   creating a card creation invitation with the card app running on the organizer computing device wherein the invitation includes a name of the recipient and a deadline date for submitting the cards;
   transmitting the card creation invitation to the participant mobile computing devices;
   accepting the card creation invitation on each of the participant mobile computing devices;

analyzing a finger movement on touch screen user interfaces on the participant mobile computing devices;

determining hand written words from the finger movement on the participant mobile computing devices;

creating card designs using the card app that include the hand written words on the virtual paper on the participant mobile computing devices;

transmitting the card designs from the participant mobile computing devices to the server computer;

printing the hand written messages and the card designs on physical cards by a printer in communication with the server computer;

placing each of the physical cards into individual envelopes;

placing the physical cards and the individual envelopes into a container; and delivering the container to the mailing address of the recipient.

2. The method of claim 1 further comprising:

inputting on the organizer computing device, an event associated with the recipient associated with card creation invitation.

3. The method of claim 1 further comprising:

clicking an invitation accept button on each of the participant mobile computing devices to accepting the card creation invitation.

4. The method of claim 1 further comprising:

providing a predetermined set of card templates by the organizer computing device; and selecting and using one of the predetermined set of card templates by each of the participant mobile computing devices to create the card designs.

5. The method of claim 1 further comprising:

providing a predetermined set of card templates by the organizer computing device; and selecting and using one of the predetermined set of card templates by each of the participant mobile computing devices to create the card designs.

6. The method of claim 1 further comprising:

displaying a reminder on each of the participant mobile computing devices to create the card designs when the card designs have not been transmitted to the server computer after a predetermined period of time after the transmitting of the card creation invitation to the participant mobile computing devices.

7. The method of claim 1 further comprising:

displaying a reminder on each of the participant mobile computing devices to create the card designs when the card designs have not been transmitted to the server computer after a predetermined period of time before the deadline date for submitting the cards.

8. The method of claim 1 further comprising:

displaying current card status information for each of the participant mobile computing devices on the organizer computing device.

9. The method of claim 1 further comprising:

displaying current card status information for each of the participant mobile computing devices on each of the participant mobile computing devices.

10. The method of claim 1 further comprising:

displaying on the organizer computing device, the card designs from the participant mobile computing devices that were transmitted to the server computer; and approving the card designs for printing by the organizer computing device, before the printing the hand written messages on the card designs.

11. The method of claim 1 further comprising:

providing a server computer and a card app running on an organizer computing device and participant mobile computing devices;

creating a card creation invitation with the card app running on the organizer computing device wherein the invitation includes a name of the recipient and a deadline date for submitting the cards;

transmitting the card creation invitation to the participant mobile computing devices;

accepting the card creation invitation on each of the participant mobile computing devices;

analyzing a finger movement on touch screen user interfaces on the participant mobile computing devices;

determining hand written words from the finger movement on the participant mobile computing devices;

creating card designs using the card app that include the hand written words on the virtual paper on the participant mobile computing devices;

transmitting the card designs from the participant mobile computing devices to the server computer;

displaying on the organizer computing device, the card designs from the participant mobile computing devices that were transmitted to the server computer;

editing the card designs that were transmitted to the server computer;

transmitting the card designs with edits to the server computer;

printing the hand written messages with the edits on physical cards by a printer in communication with the server computer;

placing each of the physical cards into individual envelopes;

placing the physical cards and the individual envelopes into a container; and delivering the container to the mailing address of the recipient.

12. The method of claim 11 further comprising:

inputting on the organizer computing device, an event associated with the recipient associated with card creation invitation.

13. The method of claim 11 further comprising:

clicking an invitation accept button on each of the participant mobile computing devices to accepting the card creation invitation.

14. The method of claim 11 further comprising:

providing a predetermined set of card templates by the organizer computing device; and selecting and using one of the predetermined set of card templates by each of the participant mobile computing devices to create the card designs.

15. The method of claim 11 further comprising:

providing a predetermined set of card templates by the organizer computing device; and selecting and using one of the predetermined set of card templates by each of the participant mobile computing devices to create the card designs.

16. The method of claim 11 further comprising:

displaying a reminder on each of the participant mobile computing devices to create the card designs when the card designs have not been transmitted to the server computer after a predetermined period of time after the transmitting of the card creation invitation to the participant mobile computing devices.

17. The method of claim 11 further comprising:

displaying a reminder on each of the participant mobile computing devices to create the card designs when the card designs have not been transmitted to the server computer after a predetermined period of time before the deadline date for submitting the cards.

18. The method of claim 11 further comprising:
displaying current card status information for each of the participant mobile computing devices on each of the participant mobile computing devices.

19. The method of claim 11 wherein the editing the card designs is performed on the participant mobile computing devices.

20. The method of claim 11 wherein the editing the card designs is performed on the organizer mobile computing device.

* * * * *